United States Patent [19]

Chrysler

[11] 4,287,654
[45] Sep. 8, 1981

[54] METHOD OF MODIFYING THE ROOF OF A VEHICLE TO RECEIVE REMOVABLE ROOF PANELS

[75] Inventor: Richard R. Chrysler, Brighton, Mich.

[73] Assignee: Cars & Concepts, Inc., Brighton, Mich.

[21] Appl. No.: 40,653

[22] Filed: May 21, 1979

Related U.S. Application Data

[60] Continuation of Ser. No. 885,545, Mar. 13, 1978, abandoned, which is a division of Ser. No. 755,665, Dec. 30, 1976, Pat. No. 4,120,529.

[51] Int. Cl.³ .................... B23P 23/00; B23P 17/04; B21K 21/16
[52] U.S. Cl. .................... 29/401.1; 29/434; 29/526 R
[58] Field of Search .......... 29/401.1, 434, 155 R, 29/526 R; 296/137 B, 146, 218

[56] References Cited

U.S. PATENT DOCUMENTS

| | | | |
|---|---|---|---|
| 2,556,062 | 6/1951 | Buehrig | 296/218 |
| 2,938,749 | 5/1960 | Podolan | 296/146 |
| 3,309,759 | 3/1967 | Vittone | 29/155 R |
| 3,730,582 | 5/1973 | Lieffring | 29/401.1 X |
| 3,776,591 | 12/1973 | Krueger | 29/428 X |
| 4,121,870 | 10/1978 | Oakey | 296/218 |

FOREIGN PATENT DOCUMENTS 1059708  2/1967  United Kingdom .

OTHER PUBLICATIONS 1953-1973, Corvette Catalog, Aug. 1973, General Motors Corporation, pp. 12–19P.
1969, Corvette Brochure, p. 4.
Corvette News, Oct.-Nov. 1977, Issue, p. 11.

*Primary Examiner*—Charlie T. Moon
*Attorney, Agent, or Firm*—Fisher, Gerhardt, Crampton & Groh

[57] ABSTRACT

A removable roof panel arrangement for motor vehicles and the method of installing such panels in which access openings to be covered by the panels are formed at opposite sides of the center of the vehicle body by completely cutting away a transverse section of the roof of the vehicle body and subsequently installing a central frame member which is attached to forward and rearward frame members through a reinforcing member. The construction retains the strength of the original body and the frame members form drainage troughs and support sealing members for engaging the removable panels which form secondary drainage systems to maintain the panels in weather tight relationship to the roof of the vehicle.

6 Claims, 11 Drawing Figures

METHOD OF MODIFYING THE ROOF OF A VEHICLE TO RECEIVE REMOVABLE ROOF PANELS

This is a continuation of application Ser. No. 885,545, filed Mar. 13, 1978, now abandoned, which is a division of appliation Ser. No. 755,665 filed Dec. 30, 1976 now U.S. Pat. No. 4,120,529, issued Oct. 17, 1978.

This invention relates to vehicle bodies and more particularly to removable panel arrangements for the roof of vehicles and the method of installing such panels in the roof portion of conventional automobiles.

Removable panels have been provided of the type in which a pair of panels are disposed in association with the door opening at opposite sides of the vehicle. In such an arrangement, installation is made by cutting away openings in the roof leaving a portion of the original body disposed longitudinally of the body and between the openings which are to be covered by the panels. Such arrangements are referred to as T-tops or hatch tops and are difficult to make since they require careful positioning of templates relative to each other and complexus installation and finishing of the perimeter of the roof openings. In addition such installations weaken the vehicle body or change the characteristics of the body to withstand certain loads imposed during operation of the vehicle.

If is an object of the invention to provide a removable panel arrangement for vehicle roofs and the method of installing such panel arrangements in which the installation is greatly simplified.

Another object of the invention is to provide a panel arrangement and method of installation in which although the roof section is reduced, the arrangement reinforces and strengthens the body to retain its original characteristics.

A further object of the invention is to provide a panel arrangement and method of installation by which roof openings to accept a pair of panels may be made large in both the transverse and longitudinal direction of the vehicle to provide a maximum opening in the roof.

Still another object of the invention is to provide a panel arrangement and method of installation in which the pair of panels at opposite sides of the vehicle serves to conceal the roof portion between the panels when the panels are in place.

Another object is to provide an improved sealing and drainage system for a removable panel arrangement for vehicles which maintains the vehicle roof in weather-tight condition.

A removable roof panel arrangement and method of installation of such panels in vehicles has been provided in which the original body of the vehicle is cut transversely to remove a roof section to the rear of the windshield header. The removed roof section is replaced with forward and rearward frame members which are joined by a central longitudinal member and a reinforcing member which has portions disposed transversely of the vehicle and longitudinally of the vehicle and which is fastened to the transverse frame member and central frame member so that the beaming strength and resistance to torsional deflection is retained in the vehicle body. The roof openings defined by the forward, rearward and central frame members are provided with a molding arrangement which forms a trough for accumulating and completely and rapidly draining all moisture from the vehicle roof to the sides of the vehicles when the vehicle is being driven or is parked at different attitudes. The molding acts also to retain a resilient seal which engages the roof panels closing the opening to form a weather-tight roof with the seals themselves forming an auxiliary drainage system to accumulate and drain moisture that may escape the sealing surfaces engaging the panel. The panels themselves are held detachably in position and may be formed of transparent, opaque or solid materials.

Figure 1:
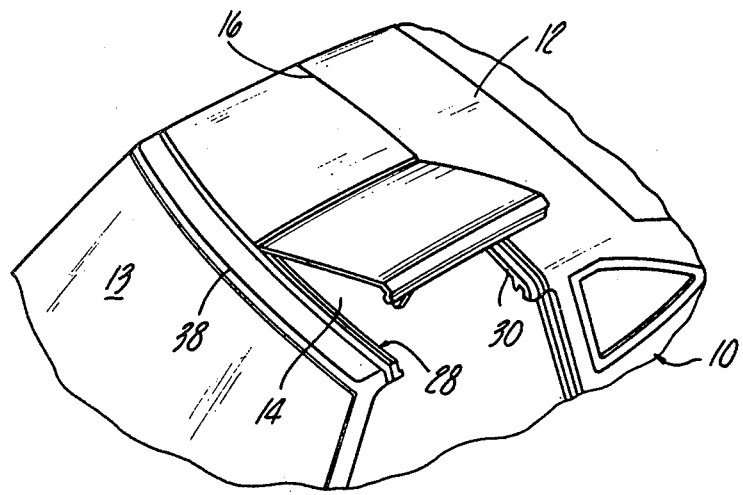
FIG. 1 is a perspective view of a roof portion of a vehicle body with roof panels embodying the present invention shown in their relative positions with one of the panels partially removed.
Figure 2:
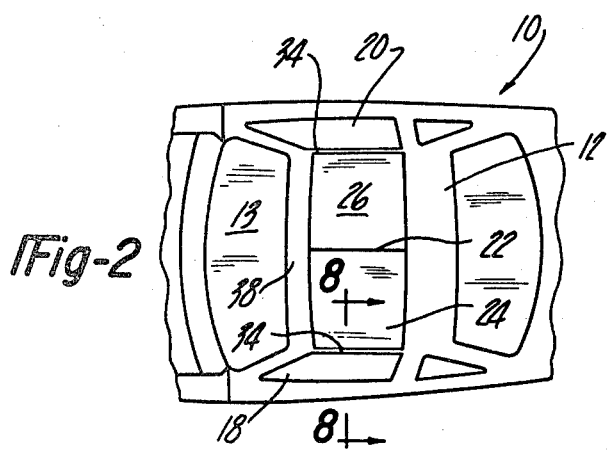
FIG. 2 is a top view of a portion of the vehicle body showing the panel portions in position.
Figure 3:
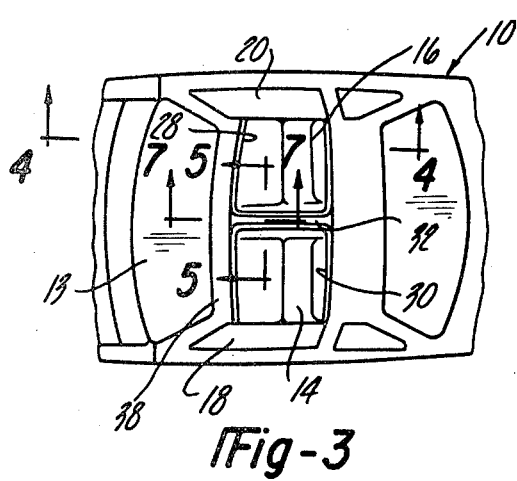
FIG. 3 is a view similar to FIG. 2 showing the roof panels removed.

The removable roof panel arrangement of the present invention is incorporated in an automotive vehicle body 10 having a roof portion 12 extending rearwardly from the windshield 13. The roof portion 12 is provided with a pair of openings 14 and 16 which are best seen in FIG. 3 and are an extension of the window openings 18 and 20 disposed at opposite sides of a longitudinal center line 22 of the vehicle as best seen in FIG. 2. The openings 14 and 16 are closed with detachable panels 24 and 26, respectively, which may be removed if desired and when in place as seen in FIG. 2, form a weather-tight roof assembly.

In general the openings 14 and 16 are formed by portions of a forward frame member 28, a rearward frame member 30 and a central frame member 32. The frame members act to form three sides of each of the openings 14 and 16. The fourth side of the openings merges with the window openings 18 and 20. When panels 24 and 26 are in place as seen in FIG. 2 the sill or edge portions 34 of the panels form the fourth side and act to engage the upper edge of the windows 36 which close the window openings 28 and 30.

Figure 4:
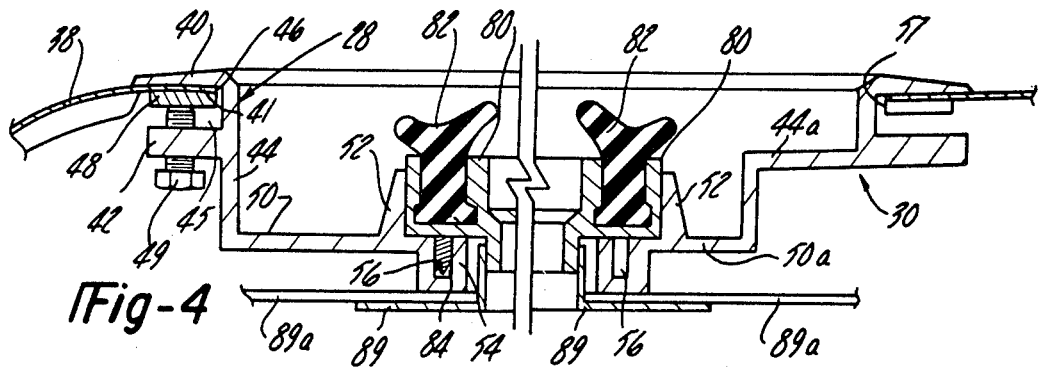
FIG. 4 is a cross-sectional view at an enlarged scale taken generally on line 4—4 in FIG. 3.

The forward frame member 28 extends transversely of the vehicle rearwardly of a windshield header 38 immediately above the windshield 13. As best seen in FIG. 4 the forward frame member 28 is in the form of an aluminum extrusion having a relatively complex cross section. The forward frame member 28 has a trim flange 40 adapted to engage the upper surface of the sheet metal layer 41 forming a part of the roof adjacent to the windshield header 38. The trim flange 40 is disposed parallel to a mounting flange 42 extending from a generally vertically extending web 44. The trim flange and mounting flange form a space 45 to receive a marginal edge 46 of the sheet metal layer 41 of the roof and a reinforcing member 48. The reinforcing member 48 is generally the same length as the frame member 28 and lies at the underside of the sheet metal edge portion 46 opposite to the trim flange 40. The reinforcing member 48 is held in position to sandwich the metal roof portion between the trim flange 40 and the reinforcing member 48 by a plurality of uniformly spaced screws 49 which are threadably engaged in the mounting flange 42.

The lower end of the web portion 44 has a base portion 50, the upper surface of which has a vertical wall 52 extending parallel to the web 44 and acting with the latter and the base 50 and wall 52 to form a trough which acts to accumulate and divert moisture. A bracket portion 54 is formed to on side of the wall 52 and is in the form of a channel having a groove 56 disposed generally parallel to the wall 52.

The rearward frame member 30 has a cross section very similar to the forward frame member 28 except that instead of a web 44 a stepped web 44a is employed so that the base portion 50a is narrower than the base portion 50 of the forward frame member 28. The wall 52 and opposed portion of the stepped web 44A form a trough similar to that associated with the forward frame member 28. This design allows for clearance to internal structural members on the existing vehicle roof. When such clearance is unnecessary, the rear frame member 30 can be the same as the front frame member 28. The frame member 30 is mounted on a rearward edge portion 57 of the sheet metal roof which extends transversely of the vehicle to the rear of the window openings 18 and 20.

Figure 5:
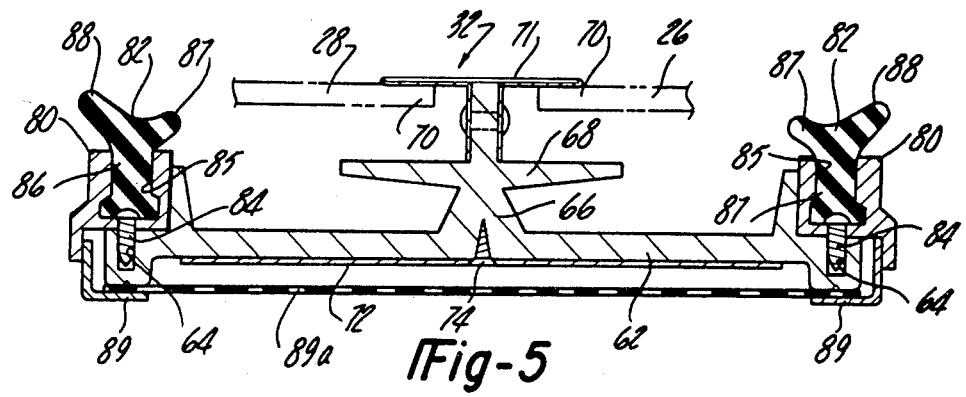
FIG. 5 is a cross-sectional view at an enlarged scale taken generally along line 5—5 in FIG. 3.
Figure 6:
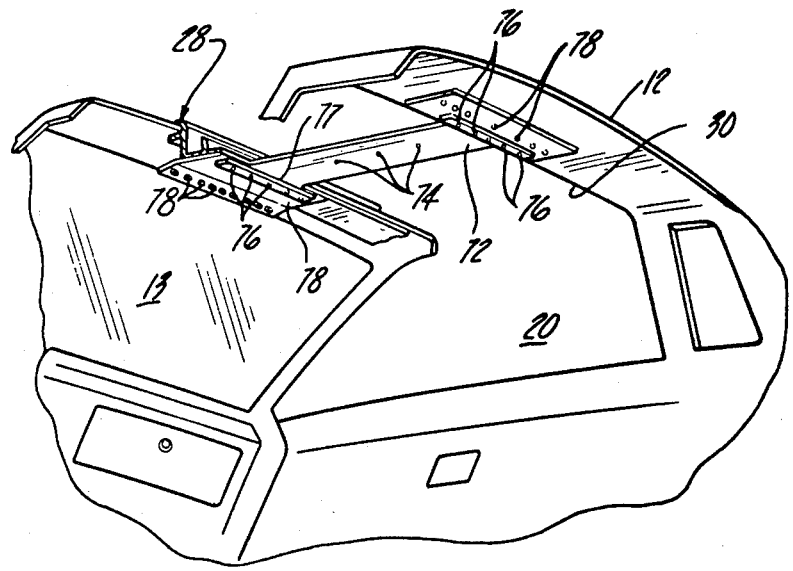
FIG. 6 is a perspective view from the interior of the vehicle and showing the underside of the roof and reinforcing portion.
Figure 7:
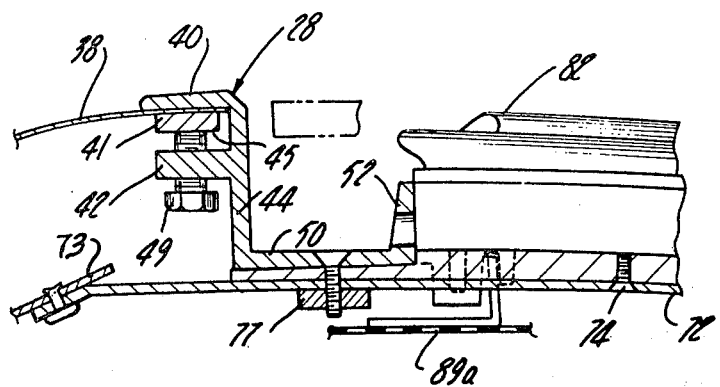
FIG. 7 is a cross-sectional view taken generally on line 7—7 in FIG. 3.

The forward frame member 28 and rearward frame member 30 are joined together by the central frame member 32 which is best seen in FIGS. 5, 6 and 7. The central frame member 32 is an aluminum extrusion having a base portion 62 the opposite marginal edges of which are provided with U-shaped channel portions having a groove 64. A central portion of the base member 62 has a web 66 which extends generally vertically upwardly. Extending from opposite sides of the web portion 66 and elevated above the base 62 is a platform portion 68 which serves as a guide for the central or inner edge portions 70 of the panels 24 and 26 when they are being placed into closing position. The upper end of webb 66 has a T-shaped molding 71 which engages the top of the panels 26 and 28 adjacent the inner edges 70.

As seen in FIG. 6 the underside of the central frame member 32 is provided with a reinforcing member 72 which acts not only to facilitate fastening of the central frame member to the forward and rearward frame members but also to absorb various loads which might be imposed on the vehicle during its operation. The reinforcing member 72 preferably is of steel sheet material and as best seen in FIG. 6 is generally H-shaped in configuration so that when the frame member is in position, the reinforcing member 72 has portions for attachment not only to the central frame member 32 and to portions of the forward and rearward frame members 28 and 30 which are disposed at opposite sides of the central frame member but also to inner original structure of the vehicle roof such as that to the rear of the windshield header 38 as indicated at 73 in FIG. 7. Similar roof structure, not shown, may be located to the rear of the rear frame member 30. The reinforcing member 72 is attached to the central frame member by a plurality of fasteners such as screws 74. The assembly of the central frame member 32 and the reinforcing plate 72 are held rigidly in position relative to the forward and rearward frame members 26 and 28 by means of bolts 76 which pass through the forward frame member 28, the central frame member 32, the reinforcing plate 72 and a tapping plate 77. A tapping plate 77 is used in association with both the forward and rearward frames 28 and 30. Additionally, pop rivets 78 are used to secure the reinforcing plate 72 to original portions of the inner roof structure of the vehicle or to other transverse frame members of the body, not shown.

Although the reinforcing plate 72 is relatively thin it makes it possible to use a relatively narrow central frame member 32 so that the openings 14 and 16 have a maximum transverse dimension. The reinforcing member 72 acts in conjunction with the central frame member 32 to increase the beaming strength of the vehicle body. By beaming strength is meant the tendency of the forward and rearward frame members 28 and 30 to move towards each other in the absence of a central structural member. The horizontal cross-sectional portions of the central beam assembly such as the base member 62, the platform 68 and the reinforcing member 74 serve to increase the resistance to torsional distortion of the body. Torsional distortion is the characteristic which causes the rearward portion of the body to move or twist relative to the forward portion of the body about a longitudinal axis passing intermediate the body roof and floor. Such torsional displacement requires the forward and rearward frame members 28 and 30 to move laterally relative to each other and would require a distortion of the reinforcing member 74.

A seal assembly 79 including a seal retainer 80 and a seal 82 extends around three sides of each of the openings 14 and 16. The seal retainer 80 is in the form of an aluminum extrusion having a general channel shaped cross section as seen in FIGS. 4 and 5. The retainer 80 is secured in position relative to the forward and rearward frame members and the central frame member by means of self tapping screws 84, the threads of which engage the opposing walls of the grooves 54 and 64. The seal retainer 80 extends along three sides of each of the openings 14 and 16. The groove 85 of the channel shaped retainer 80 receives the seal 82 which is made of a foam like rubber material and has a generally Y-shaped configuration with a leg 86 which fits in the groove of the retainer and arms 87 and 88. With the panels 24 and 26 in position the flexible arms 86 and 87 are deformed to form a weather-tight seal with the underside of the panels. When the panels are removed, the seal portions formed by arms 87 and 88 return to their relatively as molded condition and any moisture that passes the arm 87 accumulates in the space between the arms 87 and 88 and is diverted to the side of the vehicle.

The interior of the vehicle body in the areas of the frame members 28, 30 and 32 may be finished by a molding member 89 which may be fastened to the frame members in any conventional manner as by screws to clamp the headliner 89a which typically is used to finish off the interior of the vehicle.

Figure 10:
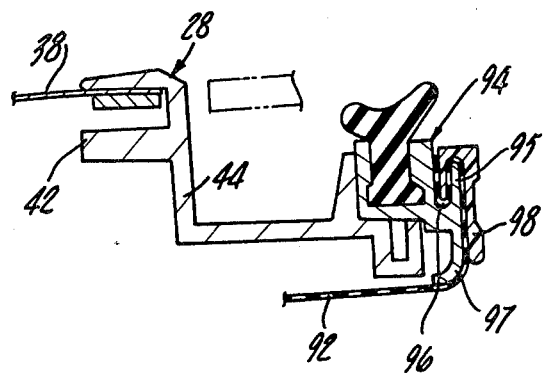
FIG. 10 is a modification of a portion of the arrangement seen in FIG. 4.

The headliner 89a indicated in FIGS. 4 and 5 is a semi-rigid structure. In some vehicles however the headliner is of a flexible cloth material such as that indicated at 92 in FIG. 10. With flexible headliners 92, a modified seal retainer 94 is used which is provided with an upper flange 95 forming a slot 96 and a lower flange 97. The soft headliner material is pulled tightly about the flange 97 and is locked in position in the slot 96 by means of a retainer strip 98 which serves to hold the flexible headliner 92 relative to the seal assembly 94 at three sides of the panel openings 14 and 16.

Figure 8:
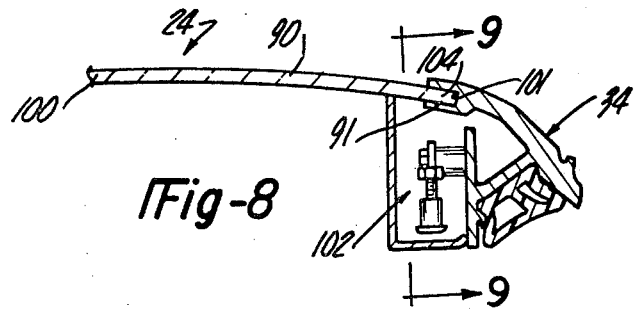
FIG. 8 is a sectional view of a portion of a roof panel taken generally on line 8—8 in FIG. 2.
Figure 9:
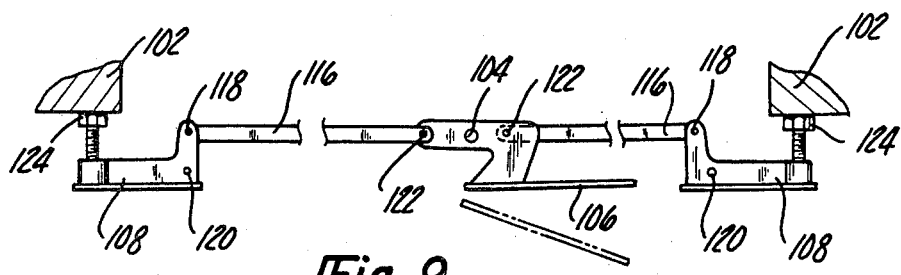
FIG. 9 is a view of the latch mechanism used to retain the roof panel in position.

The openings 14 and 16 are closed by the panels 24 and 26 each of which is generally identical so that is becomes necessary to refer only to the panel 24. Referring now to FIG. 8 the panel 24 includes a panel portion 100 of laminated or tempered glass, sheet metal or plastic. The outboard edge 101 of the panel 24 is fitted with the window header or side rail 34 including a latch assembly 102. The window header 34 is an aluminum extrusion having a slot 104 for receiving the outboard edge 101 of the panel 100. The header 34 supports the latch arrangement 102 which as seen in FIG. 9 is a mechanism incorporating a single handle 106 to move a pair of lock members 108 at opposite ends of side rail 34 adjacent the forward and rearward edges of the panel 24. The lock members 108 are engagable with portions of the body member indicated at 102 to detachably hold the panel 24 in position. The handle 106 is pivoted about an axis indicated at 104 and is pivotally connected to a pair of links 116 the outer ends of which are pivotally connected by pins 118 to the pair of lock mechanisms 108. Each of the lock members 108 is generally L-shaped and is pivoted on the header 34 for movement about an axis indicated at 120. The inner ends of links 116 are pivotally connected at 122. The outboard ends of the lock members 108 are provided with adjustable seats 124 which may be adjusted by rotating them relative to the L-shaped members 108.

The handle 106 is actually an over centered device such that when the panel 24 is in its closed position and the seats 124 are in engagement with the underside of the frame members, pivotal movement of the lock members 108 about their axes 120 is resisted due to the over centered position of the pivot points 122 relative to the pivot 114 which tends to urge the handle 106 in a counterclockwise direction as viewed in FIG. 9. When the handle member 106 is rotated generally in a clockwise direction as viewed in FIG. 9, the seats 124 are moved out of engagement with the portions 112 and permit the panel member 24 to be first pivoted generally upwardly about its inner edge 70 after which it may be removed from engagement with the central frame member 32. Upon removal of the panel members 24 and 26 they may be stored in the vehicle for replacement when needed.

It will be noted that when the panels 24 and 26 are in their closed position, the inner edges 70 as seen in FIG. 5 are very close together, separated only by the web 66 of the central frame member 32. As a result, the panels 24 and 26 serve to conceal the central frame structure and give an outward appearance of the panel edges 70 being in abutment or closely adjacent to each other.

Figure 11:
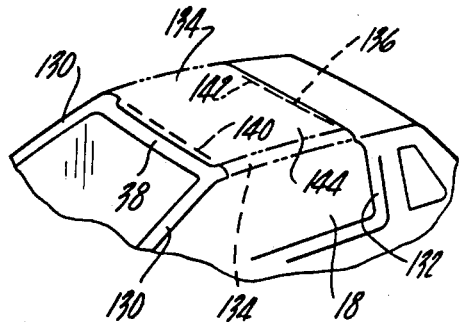
FIG. 11 is a perspective view of the roof portion of a vehicle body prior to modification.

The present panel construction is particularly adapted for installation in the conventional bodies of vehicles having a solid metal top roof portion. The method of converting or modifying the roof of a conventional automotive body will best be understood by referring to FIG. 11 in which one type of conventional vehicle body 10 has a roof construction including the windshield header 38 which is supported by a pair of pillars 130 at opposite sides of the windshield and at the forward leading edge of the window openings 18 and 20. The rearward edge of the window openings are formed by another pair of vertically extending pillars 132 which are joined to the forward pillars by side rails 134 at opposite sides of the vehicle also one or more cross members 136 may be used. A sheet of material, usually of metal is integrally fastened to cover the windshield header 38, side rails 134 and any other structural cross members 136.

In preparation for installation of the roof panel assembly of the present invention, the vehicle body is prepared for modification by removing certain parts which are either replaced after installation of the panel assembly or are modified and reused. Some of these parts include the interior molding adjacent to the windshield header, the sun visor, interior moldings, liners, such as liners 89a or 92, dome lights and shoulders belt mechanisms. Also, the exterior of the body is prepared by removing weather striping around the window cavities.

With the automotive vehicle body prepared in this manner, the vehicle body is modified by cutting the outer sheet metal cover 41 of the roof portion of the vehicle body and the side rails 134 along transverse lines which are generally symmetrical to the longitudinal center line of the vehicle. One of these lines is indicated at 140 and is closely adjacent to the rearward portion of the windshield header 38, the other line is indicated at 142 and extends between the rearward pillars and is spaced rearwardly from the line 140. Cutting of the roof in this manner may be accomplished with metal cutting shears or a saw and after two cuts are made along the lines 140 and 142 the intervening body portion 144 is removed and discarded.

After removal of the portion 144, the forward and rearward frame members 28 and 30, respectively, are installed by using a liberal amount of sealer material in the spaces 45. With the reinforcing member 48 disposed adjacent to and underneath the edge 46 of the sheel metal roof portion adjacent to the header 38 the edge portion 46 and reinforcing member 48 are disposed in the slot 45. Thereafter, the sheet metal screws 49 are tightened to sandwich the reinforcing member 48, edge portion 46 and the trim flange 40 relative to each other.

After installation of the forward and rearward frame members 28 and 30 and the reinforcement strips 48, the center frame portion 32 is installed by inserting the bolts 76 which pass through the forward and rearward frame members 28 and 30, the central frame member 32, and the tapping plates 77.

After the central member is installed by fastening of the bolts 76, additional holes formed in the reinforcing plate are used as guides to drill additional holes which pass through portions of the original inner roof structure or portions added as needed. Fasteners such as the pop rivets 28 may be used to fasten the reinforcing member to such transverse members.

After the central frame member is installed, the next step is to install the seal assembly 79 which includes the seal retainer 80 and the seal 82. The assemblies are installed along the perimeter of each of the openings 14 and 16. The seal retainer is first installed in position by means of the screws 84 which enter the grooves 56 and 64 in the frame members 28, 30 and 32. Thereafter, the leg 86 of seal 82 is pushed into the groove 85 of the seal retainer 80.

Prior to installation of the seal retainer, corner molding element are installed in the corners at the points where the forward and rearward frame members merge with the central frame member. Preferably the next step in the operation is to trim the original headliner of the vehicle. Such headliners may be of a more or less rigid type which is molded as indicated at 89a or of cloth material which is flexible as indicated at 92. To install a semi-rigid headliner 89a, it is cut to fit and moldings 89 made of plastic or metal are used to clamp the headliner in position. With the headliner of soft flexible material 92, the material is wrapped over the flanges 95 and 97 and is held in position by a locking molding 98.

With the interior molding 89 or 98 in place, the various interior components originally removed may be replaced. Such components include the seat belt retractors, sun visors, etc. Thereafter, the previously removed window moldings and weather striping may be replaced. The panels 24 and 26 may be placed in position by using the platform portion 68 as a guide to engage the inner edges 70 of the panels 24 and 26. With the panels guided into the slot formed between the shelf 68 and the T-shaped molding 71, the panel may be pivoted downwardly so that the underside of the panel engages the sealing lips of the seal 82. Thereafter, the panels 24 and 26 are locked in position by moving the handle 96 from its open to its closed position so that the seats 124 engage the underside of the vehicle body portions 102. Adjustment of the seats 124 and the clamping pressure is accomplished by threading the seats 124 relative to the L-shaped members 108.

The embodiments of the invention in which an exclusive property or privilege is claimed are defined as follows:

1. The method of modifying the roof of a vehicle body to receive detachable panels in which the vehicle body has a roof of rigid material, the steps comprising; cutting the roof of the body transversely from the door space at one side of the vehicle body to the door space at the other side of the vehicle body along transversely extending lines spaced longitudinally of the vehicle body, removing the roof portion between said spaced lines, installing a frame member on the longitudinal center line of the vehicle body and fastening opposite ends of the frame member to the roof of said vehicle body adjacent to said transverse lines, respectively, to form a pair of panel receiving spaces in said body at opposite sides of said frame member.

2. The method of claim 1 in which said pair of lines define forward and rearward edge portions of an opening in said vehicle roof and further comprising the step of attaching forward and rearward frame members to said edge portions, respectively, and attaching said central frame member to said forward and rearward frame members.

3. The combination of claim 2 and further comprising the step of installing a reinforcing member below said central frame member for engagement with the latter and with portions of said forward and rearward frame members, and installing fastening means to pass through said forward and rearward frame members, said central frame member and said reinforcing member.

4. The method of claim 13 in which the body member includes a liner within said body member, the steps of temporarily removing said liner prior to cutting of said rails and roof panel, cutting said liner material after installation of said central frame member to conform generally to the panel receiving spaces at opposite sides of said frame member, and attaching said liner to the perimeter of said openings formed by said central frame member and said forward and rearward frame members.

5. The method of modifying a vehicle body to receive detachable roof panels in which the vehicle body includes a relatively rigid roof having side rails extending longitudinally and rearwardly at opposite sides of said body from a windshield header, and a metal roof panel formed integrally with said side rails and with said windshield header, the steps comprising; cutting completely through said roof panel and said side rails along a pair of transverse lines, one of which extends adjacent to said windshield header and the other of which is spaced rearwardly of said one line, removing the portions of said roof and side rails between said lines from the remainder of the vehicle body, and positioning a frame member on the center line of the vehicle body and attaching opposite ends to said vehicle body adjacent said pair of transverse lines, respectively, to form panel receiving spaces at opposite sides of said frame member and between said transverse lines.

6. The method of claim 2 and further comprising attaching a pair of flexible seal elements to said forward, rearward and central frame members adjacent to the edges of said panel receiving spaces, respectively.

* * * * *

UNITED STATES PATENT AND TRADEMARK OFFICE
CERTIFICATE OF CORRECTION

PATENT NO. : 4,287,654
DATED : September 8, 1981
INVENTOR(S) : Richard R. Chrysler It is certified that error appears in the above—identified patent and that said Letters Patent is hereby corrected as shown below:

Column 8, claim 4, line 11, "claim 13" should read --claim 3--

*Signed and Sealed this*

*Nineteenth* Day of *January 1982*

[SEAL]

*Attest:*

GERALD J. MOSSINGHOFF

*Attesting Officer*   Commissioner of Patents and Trademarks